(12) United States Patent
Carel et al.

(10) Patent No.: US 7,785,661 B2
(45) Date of Patent: *Aug. 31, 2010

(54) METHODS OF PREPARING COMPOSITE CARBON-GRAPHITE-SILICON PARTICLES AND USING SAME

(75) Inventors: Mark Carel, Ponca City, OK (US); Zhenhua Mao, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/482,952

(22) Filed: Jun. 11, 2009

(65) Prior Publication Data

US 2009/0252864 A1   Oct. 8, 2009

Related U.S. Application Data

(63) Continuation-in-part of application No. 10/741,381, filed on Dec. 19, 2003, now Pat. No. 7,618,678.

(51) Int. Cl.
B05D 7/00 (2006.01)
(52) U.S. Cl. .................. 427/212; 427/122; 427/215; 427/228
(58) Field of Classification Search ............ 427/212, 427/122, 215, 228
See application file for complete search history.

(56) References Cited

U.S. PATENT DOCUMENTS

| 4,064,330 A | 12/1977 | Gaines, Jr. et al. ........... 429/218 |
| 4,199,363 A | 4/1980 | Chen |
| 4,503,026 A | 3/1985 | Dickakian |
| 4,550,064 A | 10/1985 | Yen et al. ...................... 429/94 |
| 4,619,805 A | 10/1986 | Dias et al. |
| 4,980,250 A | 12/1990 | Takahashi |
| 5,028,500 A | 7/1991 | Fong et al. ................... 429/194 |
| 5,030,529 A | 7/1991 | Wada et al. .................. 429/209 |
| 5,053,295 A | 10/1991 | Hope et al. .................. 429/161 |
| 5,069,683 A | 12/1991 | Fong et al. ................... 429/218 |
| 5,162,175 A | 11/1992 | Visco et al. .................. 429/192 |
| 5,168,019 A | 12/1992 | Sugeno ........................ 429/194 |
| 5,171,413 A | 12/1992 | Arntz et al. ............ 204/192.15 |

(Continued)

FOREIGN PATENT DOCUMENTS

EP    1020944 A2    7/2000

(Continued)

OTHER PUBLICATIONS

D. Larcher, et al., *Si-containing disordered carbons prepared by pyrolysis of pitch/polysilane blends: effect of oxygen and sulfur*, Solid State Ionics, vol. 122, Issues 1-4, 71-83 (1999).

(Continued)

*Primary Examiner*—Elena T Lightfoot

(57) ABSTRACT

A process for production of coated silicon-carbon composite particles includes providing a carbon residue-forming material, providing particles of a carbonaceous material, and coating in a liquid suspension mixture the particles of carbonaceous material with the carbon residue-forming material to form coated carbonaceous particles. Providing silicon particles added to the mixture, coating the silicon particles embedded on the coated carbonaceous particles to form silicon-carbon composite particle. Some embodiments utilize the composite particle in an anode of a battery.

20 Claims, 3 Drawing Sheets

U.S. PATENT DOCUMENTS

| | | | |
|---|---|---|---|
| 5,196,279 A | 3/1993 | Tarascon | 429/194 |
| 5,238,760 A | 8/1993 | Takahashi et al. | 429/194 |
| 5,256,504 A | 10/1993 | Okuno et al. | 429/197 |
| 5,326,658 A | 7/1994 | Takahashi et al. | 429/194 |
| 5,352,548 A | 10/1994 | Fujimoto | |
| 5,387,479 A | 2/1995 | Koksbang | |
| 5,436,093 A | 7/1995 | Huang | |
| 5,451,477 A | 9/1995 | Omaru et al. | 429/218 |
| 5,474,862 A | 12/1995 | Okuno | |
| 5,482,797 A | 1/1996 | Yamada et al. | 429/218 |
| 5,498,493 A | 3/1996 | Dahn et al. | 429/218 |
| 5,510,212 A | 4/1996 | Delnick et al. | 429/218 |
| 5,565,284 A | 10/1996 | Koga | |
| 5,595,838 A | 1/1997 | Yamada | |
| 5,612,155 A | 3/1997 | Takami | |
| 5,639,575 A | 6/1997 | Omaru et al. | 429/197 |
| 5,656,394 A | 8/1997 | Koksbang | |
| 5,683,834 A | 11/1997 | Fujimoto et al. | 429/218 |
| 5,705,222 A | 1/1998 | Somasundaran et al. | |
| 5,753,387 A | 5/1998 | Takami | |
| 5,776,610 A | 7/1998 | Yamada | |
| 5,798,033 A | 8/1998 | Uemiya | |
| 5,882,818 A | 3/1999 | Fujimoto et al. | 429/197 |
| 5,894,403 A | 4/1999 | Shah | |
| 5,900,336 A | 5/1999 | Kabata | |
| 5,993,997 A | 11/1999 | Fujimoto et al. | 429/231.8 |
| 6,008,569 A | 12/1999 | Yamanobe | |
| 6,022,518 A | 2/2000 | Yamazaki et al. | 423/448 |
| 6,060,190 A | 5/2000 | Campbell | |
| 6,066,413 A | 5/2000 | Aymard | |
| 6,083,645 A | 7/2000 | Takeuchi et al. | 429/231.8 |
| 6,096,454 A | 8/2000 | Tran et al. | 429/231.8 |
| 6,118,573 A | 9/2000 | Kubo | |
| 6,123,829 A | 9/2000 | Zimmerman et al. | |
| 6,156,432 A | 12/2000 | Mabuchi | |
| 6,218,050 B1 | 4/2001 | Yoon et al. | 429/231.8 |
| 6,235,427 B1 | 5/2001 | Idota et al. | 429/218.1 |
| 6,265,110 B1 | 7/2001 | Rao | |
| 6,294,291 B1 | 9/2001 | Ozaki et al. | 429/231.4 |
| 6,300,013 B1 | 10/2001 | Yamada et al. | |
| 6,342,319 B1 | 1/2002 | Kuboki et al. | 429/231.8 |
| 6,350,544 B1 | 2/2002 | Takami et al. | 429/231.4 |
| 6,355,377 B1 | 3/2002 | Sheem et al. | 429/231.8 |
| 6,383,467 B1 | 5/2002 | Honbo et al. | 423/448 |
| 6,383,686 B1 | 5/2002 | Umeno et al. | 429/231.8 |
| 6,391,495 B1 | 5/2002 | Choi | |
| 6,395,427 B1 | 5/2002 | Sheem | |
| 6,403,259 B1 | 6/2002 | Kitagawa et al. | 429/231.4 |
| 6,413,672 B1 | 7/2002 | Suzuki | |
| 6,432,583 B1 | 8/2002 | Fukuda et al. | 429/231.4 |
| 6,436,573 B1 | 8/2002 | Goto | |
| 6,440,610 B1 | 8/2002 | Sheem | |
| 6,475,670 B1 | 11/2002 | Ito | |
| 6,482,547 B1 | 11/2002 | Yoon | |
| 6,503,660 B2 | 1/2003 | Baker et al. | 429/231.95 |
| 6,506,520 B1 | 1/2003 | Inoue | |
| 6,528,212 B1 | 3/2003 | Kusumoto et al. | 429/233 |
| 6,541,156 B1 | 4/2003 | Fuse et al. | 429/218.1 |
| 6,569,557 B1 | 5/2003 | Kitoh | |
| 6,589,694 B1 | 7/2003 | Gosho et al. | 429/231.1 |
| 6,589,696 B2 | 7/2003 | Matsubara et al. | 429/231.8 |
| 6,605,386 B1 | 8/2003 | Kasamatsu | |
| 6,623,889 B2 | 9/2003 | Morita et al. | 429/231.8 |
| 6,627,352 B1 | 9/2003 | Okochi | |
| 6,723,471 B2 | 4/2004 | Kitagawa | |
| 6,733,922 B2 | 5/2004 | Matsubara et al. | |
| 6,749,892 B2 | 6/2004 | Chang | |
| 6,770,399 B2 | 8/2004 | Umeno et al. | |
| 6,884,350 B2 | 4/2005 | Muller | |
| 7,323,120 B2 | 1/2008 | Mao | |
| 7,618,678 B2 * | 11/2009 | Mao et al. | 427/212 |
| 2002/0009646 A1 | 1/2002 | Matsubara et al. | |
| 2002/0074972 A1 | 6/2002 | Narang et al. | 320/131 |
| 2002/0168574 A1 | 11/2002 | Ahn et al. | 429/232 |
| 2003/0091901 A1 | 5/2003 | Kaneda et al. | |
| 2004/0042954 A1 | 3/2004 | Park et al. | |

FOREIGN PATENT DOCUMENTS

| | | |
|---|---|---|
| JP | 61034222 A | 2/1986 |
| JP | 03187908 A | 8/1991 |
| JP | 09-231974 A | 9/1997 |
| JP | 11-246209 A | 9/1999 |
| JP | 01-305859 A | 12/1999 |
| JP | 2000239079 A | 9/2000 |
| JP | 2002-8656 A | 1/2002 |

OTHER PUBLICATIONS

Wang, et al., *Electrochemical study on nano-Sn, $Li_{4.4}Sn$ and $AlSi_{0.1}$ powders used as secondary lithium battery anodes*, Journal of Power Sources, 93, Nos. 1-2, 174-185 (2001).

Yang-Kook Sun, et al., *Synthesis and characterization of spinel $LiMn_{2-x}Ni_xO_4$ for lithium/polymer battery applications*, Journal of Power Sources, 79, 231-237 (1999).

Dr. Hong Shih, et al., *Electrochemical Impedance Spectroscopy for Battery Research and Development*, Technical Report 31, ©Solartron 1996, 1-61.

Wilson, et al., *Pyrolysed silicon-containing polymers as high capacity anodes for lithium-ion batteries*, Journal of Power Sources 68, 195-200 (1997).

Kurita, et al., *Molecular orbital calculations on electronic and Li-adsorption properties of sulfur-phosphorus- and silicon-substituted disordered carbons*, CARBON 40, 253-260 (2002).

Xing, et al., *Pyrolyzed Polysiloxanes for Use as Anode Materials in Lithium-Ion Batteries*, J. Electrochem Soc., vol. 144, No. 7, Jul. 1997.

Wen, et-al., "*High capacity silicon/carbon composite anode materials for lithium ion batteries*," Electrochemistry Communications 5, 165-168 (2003).

Yang, et al., "*Small particle size multiphase Li-alloy anodes for lithium-ion-batteries*," Solid State Ionics 90, 281-287 (1996).

Besenhard, "*Will advanced lithium-alloy anodes have a chance in lithium-ion batteries?*" Journal of Power Sources 68, 87-90 (1997).

EP04821041 Search Report dated Sep. 18, 2009, 2 pages.

\* cited by examiner

METHODS OF PREPARING COMPOSITE CARBON-GRAPHITE-SILICON PARTICLES AND USING SAME

CROSS-REFERENCE TO RELATED APPLICATIONS

This application is a Continuation-in-Part of U.S. patent application Ser. No. 10/741,381 filed Dec. 19, 2003 and entitled "Carbon-Coated Silicon Particle Powder as the Anode Material for Lithium Ion Batteries and the Method of Making the Same," which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

Embodiments relate to production of composite silicon-carbon powders for use as anode materials in batteries.

2. Background of the Invention

Graphite powders often form anode material for lithium ion batteries. State-of-the-art graphite anode materials have nearly reached theoretical capacity of graphite powders (372 mAh/g). However, electronic devices are being designed to be smaller requiring both functionality and energy density power to continue to increase. In order to meet these demands, better anode materials for use in construction of lithium ion batteries need to be developed.

Lithium-alloying materials such as tin and silicon provide a higher lithium absorbing capacity than graphite. For example, silicon, which has an alloying capacity approximately 10 times that of carbon (4200 mAh/g), can alloy 4.4 lithium atoms to form $SiLi_{4.4}$. However, the silicon alloying of lithium is accompanied by a significant volume expansion resulting in the process of lithium alloying and dealloying being irreversible. Consequently, plain silicon particle powders cannot be used as the anode material for lithium ion batteries. Manufacturing costs and performance issues limited usefulness of prior attempts to combine silicon and graphite.

Thus, there exists an ongoing need for an anode material for use in lithium ion batteries having improved capacity and cycling efficiency.

BRIEF SUMMARY OF SOME OF THE PREFERRED EMBODIMENTS

For one embodiment, a method enables forming a composition for an electrical storage cell. The method includes preparing a liquid suspension comprising particles of carbonaceous material and carbon residue-forming material and forming coated carbonaceous particles by subjecting the suspension to conditions that permit precipitation of the carbon residue-forming material onto the carbonaceous material. Next, adding silicon particles to the suspension once the coated carbonaceous particles are formed occurs prior to forming coated silicon-carbon composite particles by subjecting the suspension to conditions that permit precipitation of the carbon residue-forming material onto the silicon particles and the coated carbonaceous particles together.

According to one embodiment, a method includes preparing a liquid suspension including pitch and particles of carbonaceous material and forming coated silicon-carbon composite particles. The coated silicon-carbon composite particles form by subjecting the suspension to conditions that permit precipitation of the pitch onto the carbonaceous material and subsequently onto the carbonaceous material together with silicon particles added to the suspension once the carbonaceous material is coated by the pitch. The method further includes incorporating the coated silicon-carbon composite particles into an anode of an electrical storage cell.

In one embodiment, a method includes preparing a liquid suspension including pitch and particles of graphite and forming pitch coated graphite particles by subjecting the suspension to conditions that permit precipitation of the pitch onto the graphite. In addition, the method includes adding silicon particles to the suspension once the pitch coated graphite particles are formed, adding a pitch solution to the suspension with the silicon particles and the pitch coated graphite particles, and forming coated silicon-graphite composite particles. The coated silicon-graphite composite particles form by subjecting the suspension to conditions that permit precipitation of the pitch onto the silicon particles and the pitch coated graphite particles together.

BRIEF DESCRIPTION OF THE DRAWING

For a detailed description of the preferred embodiments of the disclosure, reference will now be made to the accompanying drawings.

DETAILED DESCRIPTION OF THE PREFERRED EMBODIMENTS

Figure 1:
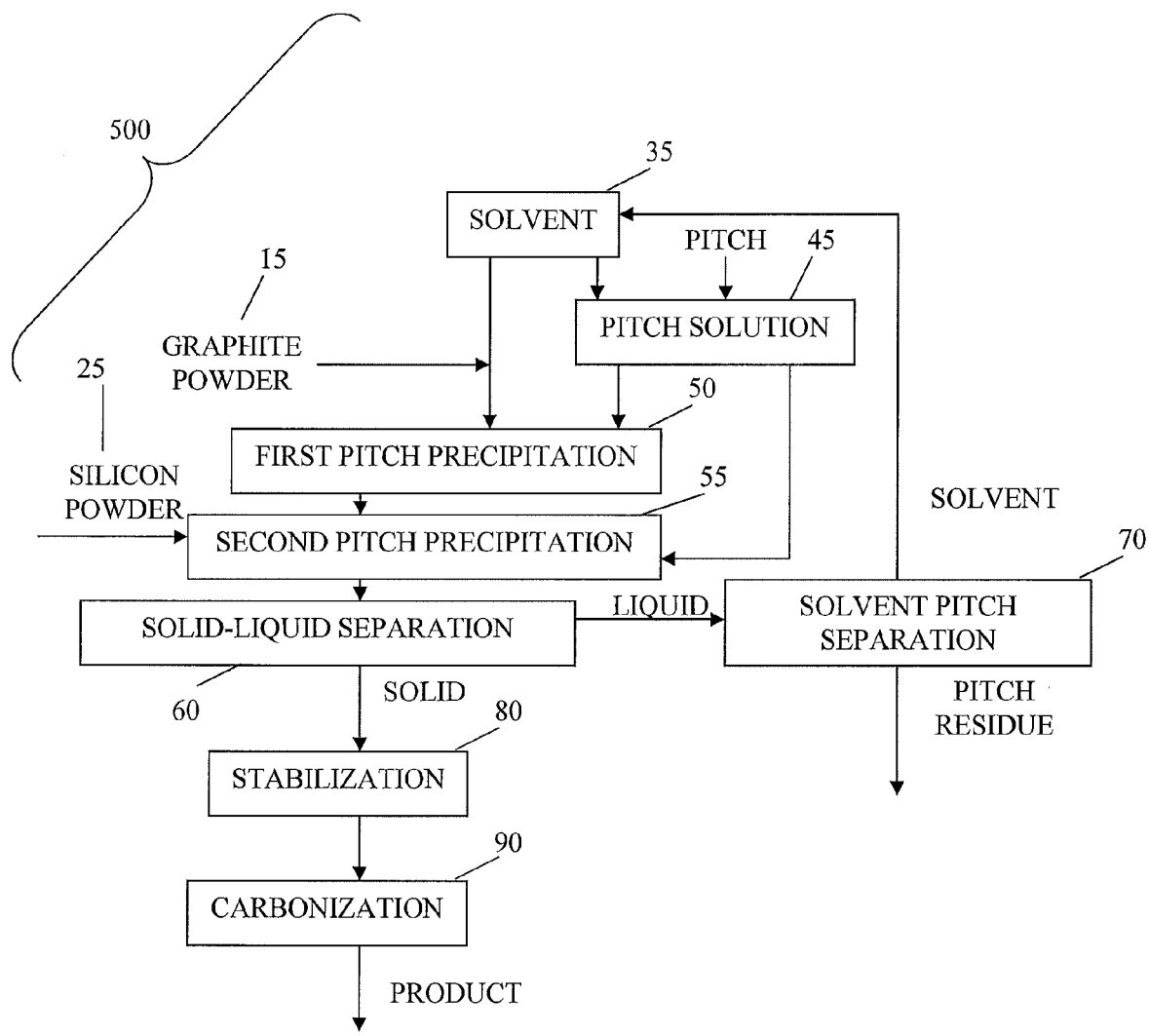
FIG. 1 is a process flow diagram for production of composite particles, according to one embodiment.

FIG. 1 illustrates one embodiment of a method for production of composite particles. Carbonaceous substrate particles are coated with a fusible, carbon residue-forming material. Particles of fine silicon powders are embedded onto the carbonaceous substrate particles to form a composite particle of silicon and carbonaceous materials. The composite particle is further provided with at least one coating of a fusible, carbon residue-forming material. The coated composite particle is thereafter stabilized and carbonized.

Coating the carbonaceous particles may occur prior to applying the silicon particles. Coated silicon particles may be embedded onto the coated carbonaceous substrate. In some embodiments, uncoated silicon particles may be embedded onto the coated carbonaceous substrate. Coating the composite silicon-carbonaceous material particles to enhance the mechanical strength of the composition may result in longer-lasting silicon composite electrodes. For some embodiments, processes provide carbon-coated silicon-carbonaceous material particles having substantially smooth coatings. Optionally, the composite particles may be coated repeatedly with carbon residue-forming material to further increase mechanical strength of the particles.

In one embodiment, composite materials comprise particles of carbonaceous substrate material. The particles of carbonaceous substrate material may be obtained from a variety of sources, examples of which include without limitation petroleum pitches, coal tar pitches, calcined petroleum cokes, uncalcined petroleum cokes, highly crystalline cokes (e.g., calcined or uncalcined, highly crystalline "needle" cokes), flake coke, coal tar cokes, synthetic graphites, natural graphites, soft carbons derived from organic polymers, soft carbons derived from natural polymer as well as other sources of carbonaceous materials that are known in the manufacture of prior art electrodes, although these sources are not elucidated here. Thus, the carbonaceous materials in some embodiments are either graphitic materials or materials which form graphite on heating to graphitization temperatures of 2200° C. or higher.

Fine particles of such carbonaceous substrate material can be provided by milling, crushing, grinding or by any other means that can be used to provide a pulverant carbonaceous substrate material having particles of dimensions that are suitable for use in formation of electrodes. Although applicable to carbonaceous substrate particles of varying sizes and particle size distributions, carbonaceous substrate particles may have an average particle size of less than about 50 μm, or from about 1 μm to about 30 μm. In some embodiments, the carbonaceous material is graphite. Hereafter, graphite is referred to as the carbonaceous material although any of the disclosed carbonaceous materials may be employed in the formation of the composite particle.

The composite particles include silicon. Purity of the silicon may be of ordinary industrial strength, i.e., 90-98 wt. %. Although applicable to silicon particles of varying sizes and particle size distributions, silicon particles may have an average particle size less than about 50 μm, from about 0.003 μm to about 20 μm, or from about 0.03 μm to about 5 μm.

The composite silicon-graphite (CSG) particles are provided with a fusible, carbon residue-forming material referred to herein as coating material. Any organic compound that can be thermally reacted to yield carbon residue can be used as the coating material. However, in coating processes in which the organic compounds are dissolved in solvent, aromatic compounds that include various molecular weights enable mutual dissolution of the compounds with the solvent. In some embodiments, the coating material for the graphite, silicon or CSG particles, as the case may be, is any material which, thermally reacted in an inert atmosphere to a carbonization temperature of at least 850° C. forms a residue which is "substantially carbon." Herein "substantially carbon" indicates that the coating material is at least 10%, at least 40%, at least 60%, or at least 85% by weight carbon following carbonization, based on the original mass of the coating material for the graphite, silicon or silicon-graphite composite particle.

Carbon residue-forming materials that are capable of being reacted with an oxidizing agent may be used as the coating materials. Suitable compounds for the carbon residue-forming materials include those with a high melting point and a high carbon yield after thermal reaction. As used herein, a "high melting point" refers to a melting point greater than about 200° C.

Exemplary useful coating materials include without limitation heavy aromatic residues from petroleum, chemical process pitches, coal tar pitches, lignin from pulp industry, phenolic resins, and carbohydrate materials such as sugars and polyacrylonitriles. Petroleum and coal tar pitches and lignin are suitable for use as coating materials, are readily available and have been observed to be effective as fusible, carbon residue-forming materials.

The coating material used for one type of particle may vary significantly from the coating material used for another type of particle. By way of non-limiting examples, the coating material provided as a coating for the graphite particles may be composed of a completely different coating material from that provided as a coating for the CSG particles. Further, subsequent coatings provided for the CSG particles may be composed of coating materials that differ from previous coatings on the CSG particles.

In some embodiments, the coating material is a pitch, such as a petroleum pitch or coal tar pitch, dissolved in a suitable solvent. Suitable solvents for dissolving the coating material include for example and without limitation, benzene, toluene, xylene, quinoline, tetrahydrofuran, naphthalene, acetone, cyclohexane, tetrahydronaphthalene, ether, water and methyl-pyrrolidinone. When petroleum or coal tar pitch is used as the coating material, solvents such as toluene, xylene, quinoline, tetrahydrofuran, tetrahydronapthalene, or naphthalene are suitable. The ratio of the solvent(s) to the coating material for the graphite particles, silicon particles or CSG particles in the composition and the temperature of the solution is controlled so that the coating material completely or almost completely dissolves into the solvent. Typically, the solvent to coating material ratio is less than about 4, alternatively less than about 3, alternatively less than about 2, and alternatively less than about 1. The coating material may be dissolved in the solvent at a temperature that is below the boiling point of the solvent.

In a method 500 of one embodiment shown in FIG. 1, four components (silicon particles 25, graphite particles 15, solvent 35 and pitch solution 45) are introduced to a mixing unit. The mixing unit may be any mixing unit suitable for blending components described herein. In one embodiment, the coating process initiates with introduction of the graphite particles 15 and the solvent 35 to the mixing unit where the graphite particles 15 and the solvent 35 are mixed and heated to a temperature of from about 20 to about 200° C. Following mixing of the graphite particles 15 and the solvent 35, the pitch solution 45 may then be introduced to the mixing unit and mixed with the graphite particles 15 to provide a liquid suspension mixture. In a first precipitation step 50, at least a portion of the pitch precipitates out of solution onto the graphite particles to form a pitch coating due to dilution of the pitch composition and/or temperature reduction of the suspension mixture. A resulting coating level on the graphite particles may be from about 1 wt. % to about 20 wt. %.

Following coating of the graphite particles 15, the silicon particles 25 are introduced to the mixing unit and mixed into the suspension mixture. Another aliquot of the pitch solution 45 may be added to the mixing unit and further mixed with the graphite particles 15 that are already coated and the silicon particles 25. In some embodiments, solvent may be added to the mixing unit prior to the introduction of additional aliquots of pitch solution 45. The additional solvent(s) can be the same as or different than the solvent(s) used to prepare the solution of the coating material or that was initially introduced with the graphite particles 15. In a second precipitation step 55, at least a portion of the pitch precipitates out of solution to form the CSG particle with silicon and graphite held together by a pitch coating due to dilution of the pitch composition and/or temperature reduction of the suspension mixture. For example, the suspension mixture may then be cooled to a temperature of from about 100 to about 20° C. so as to precipitate at least a portion of the pitch on both the silicon particles and the graphite particles previously coated by the pitch. Fine silicon particles embedded on graphite particles with solid pitch thus defines the CSG particles. In some embodiments, the pitch coating level on both the silicon and graphite particles may be from about 5 wt. % to about 40 wt. % of the total weight of the particles.

Additional aliquots of pitch composition and/or solvent may be introduced to the mixing unit any number of times to achieve the level of pitch coating desired. In some embodiments, pitch composition and/or solvent are introduced to the mixing in at least two aliquots in order to achieve the desired level of pitch coating and uniform coating layer. The desired overall total pitch coating may be from about 10 wt. % to about 50 wt. % of the total weight, from about 15 wt. % to about 40 wt. %, or from about 15 wt. % to about 35 wt. %.

Tests demonstrated that the CSG particles possess improved properties when, as set forth herein, the desired amount of coating material is not added to the particles in a single step. For example, applying a coating to a mixture of uncoated graphite particles and uncoated silicon particles all at once fails to provide unexpected superior results relating to capacity and coulombic efficiency, as shown herein. Further, processes that prepare coated graphite isolated prior to introduction into separate suspensions utilized for preparation of coated silicon and graphite containing particles may provide acceptable results at expense of manufacturing complexity and hence cost.

The total amount and morphology of the coating material that precipitates onto the surface of a particle depends on the portion of the coating material that precipitates out from the solution, which in turn depends on the difference in the solubility of the coating material in the initial composition and in the final solution. When the coating material is a pitch, wide ranges of molecular weight species are typically present. Partial precipitation of such a material fractionates the material such that the precipitate is high molecular weight and has a high melting point relative to remaining soluble components with low molecular weight and low melting point compared to the original pitch. The suspension mixture after the second precipitation step 55 contains solid components including the CSG particles and liquid components such as the solvent and pitch.

In some embodiments, the method 500 proceeds to separation block 60 to enable the solid components of the suspension mixture to be separated from the liquid components. The CSG particles may be separated from the mixture of solvent, other particles, and coating material using any method effective for achieving desired separation. For example the liquid-solid separation may be carried out by centrifugal separation or filtration. In some embodiments, the CSG particles following liquid-solid separation are washed with solvent to remove residual pitch solution (or other coating material) and dried using conventional methods.

Referring still to FIG. 1, the method 500 may then proceed to first treatment block 80 wherein the CSG particles are subjected to stabilization. The stabilization may be carried out so as to prevent the coating material from melting or fusing and enabling the formation of a smooth flowing powder. In some embodiments, the CSG particles are stabilized by a thermal-chemical treatment. Such treatments, also termed stabilization treatments, may be carried out using any methods and under any conditions compatible with the materials of this disclosure. In some embodiments, the stabilization treatment comprises heating the CSG particles to a temperature of from about 20° C. to about 450° C., or from about 250° C. to about 350° C., in presence of an oxidizing agent that is in a solid, liquid or gas phase. Herein, an oxidizing agent refers to a chemical, which can act as an electron acceptor. Examples of oxidizing agents suitable for use include without limitation air, oxygen gas, nitrogen oxides, metal salts and oxides, such as $NaNO_3$, high valence transition metal oxides such as $KMnO_4$, $K_2Cr_2O_7$, or combinations thereof.

Exact conditions for stabilization of the CSG particles depend upon the oxidizing agent used. Processes for stabilization of coating material on graphite particles have been previously described and are disclosed in detail in U.S. Publication Number 2003/0160215, which is incorporated by reference in its entirety herein.

With reference to FIG. 1, the method 500 may conclude at second treatment block 90 wherein the CSG particles are subjected to carbonization. Carbonization refers to a thermal treatment that functions primarily to increase the carbon/hydrogen ratio of the material. In some embodiments, carbonization of the CSG particles is carried out in an inert atmosphere at a temperature of from about 600° C. to about 1400° C., from about 700° C. to about 1300° C., or from about 750° C. to about 1200° C. for from about 0.1 hrs to about 2 hrs. Inert atmospheres may comprise an inert gas such as nitrogen, argon, helium, carbon dioxide, carbon monoxide, hydrogen, or combinations thereof. Following the carbonization, the CSG particles may be suitable for use as anode material in electrochemical storage cells.

In some embodiments, the method 500 includes recovery of the solvent utilized in dissolution of the coating material and in the coating process, as illustrated in recycle block 70. For example, the solvent may be separated from the pitch by thermal treatments such as heating the pitch solution to cause evaporation of the solvent or by distillation to affect separation of the solvent from the pitch. The recycle block 70 provides an optional recovery step that does not affect characteristics of the CSG particles.

Foregoing methodologies have many advantages including inexpensive production of CSG particles characterized by a high capacity and a high cycling efficiency when used as the anode material in electrochemical storage cells. The CSG particles produced as disclosed herein may be used to form electrodes, such as, for example, the anode material of electrical storage cells or rechargeable batteries. Such anodes may be further used in the construction of Li-ion batteries. In some embodiments, a method for the manufacture of an electrochemical storage cell includes incorporating the CSG particles into the anode of the electrochemical storage cell.

EXAMPLES

While embodiments have been generally described, the following examples demonstrate particular embodiments in practice and advantages thereof. The examples are given by way of illustration only and are not intended to limit the specification or the claims in any manner. The following illustrates exemplary details as well as characteristics of such prepared composite particle powders as the anode material for lithium ion batteries.

A liquid suspension mixture was prepared by dispersing 8 grams of a graphite powder (average particle size of 8 μm) in 172 grams of xylene to form composition A in a sealed stainless steel vessel and heated to 140° C. while the mixture was continuously agitated. Further, 50 grams of a petroleum pitch (Conoco C70) was dissolved in 50 grams of xylene completely to form composition B, which was heated to 90° C. Then, 15 grams of the composition B was poured into the composition A while the mixture was agitated. The mixture was heated to 145° C. and thereafter referred to as composition C. At this point, graphite particles in composition C had been coated with pitch, but were still suspended in the liquid suspension mixture. Separately, 8 grams of a silicon powder (average particle size of about 2 μm) were dispersed in 70 grams of 2% pitch solution with xylene as the solvent. A resulting mixture with the silicon powder was heated to 90° C. then poured into the composition C and mixed together at 145° C. Then, 20 grams of the composition B was added to the composition C and heated to 145° C. for 10 minutes before being cooled back to 140° C.

After a time interval of about 10 minutes, 20 grams of composition B was then added to the composition C. The composition C that resulted was heated at 160° C. for 10 minutes and then cooled to ambient temperature (~30° C.). Solids and liquids were then separated out by filtration under vacuum. A solid powder thereby obtained was washed twice with 100 ml of xylene and then dried under vacuum. A resulting dry powder weighed 28.7 grams, giving 44% pitch in the powder.

The dry powder was spread on a glass dish (about 4 inches in diameter), placed in a furnace, and heated in sequences as follows under reduced air pressure (about −15 inch Hg): 5° C./minute to 160° C., 1° C./minute to 250° C., held at 250° C. for 2 hours, 1° C./minute to 280° C., held at 280° C. for 8 hours, and then cooled to ambient temperature. Such heat treatment resulted in stabilization of the dry powder. The powder was then carbonized by heating in nitrogen gas at 1050° C. for two hours. The powder thereby produced was a carbon-coated silicon-graphite composite particle sample powder. Scanning electron microscopy images confirmed that fine silicon particles were glued by carbon and embedded on large graphite particles.

The sample powder was evaluated as anode material for lithium ion batteries in coin cells with lithium metal foil as the other electrode. Two electrode compositions were assessed for their compatibility with carbon black and binder material. A first electrode composition was 89% the sample powder, 5% acetylene carbon black, and 7% polyvinylidene fluoride (PVDF). A second electrode composition was 85% the sample powder, 7% acetylene carbon black, and 8% PVDF. In preparation of the electrodes, the sample powder, carbon black and a 10 wt % PVDF solution were mixed to form slurries with respective compositional percentages. Each of the slurries was cast on a copper foil using a hand doctor-blade. Films cast on the foils were dried on a hot plate at 110° C. for 30 minutes and subsequently pressed to a density of about 1.2 g/cc through a hydraulic rolling press. The second electrode composition resulted in a thinner pressed film than the first electrode composition.

Disks of 1.65 cm$^2$ were punched out from each of the films and used as the positive electrode in a coin cell for electrochemical tests. The other electrode was lithium metal. A glass mat and a porous polyethylene film (Cellgard™ 2300) were used as the separator between the electrode and the lithium metal. Both the electrodes and separator were soaked with 1 M LiPF$_6$ electrolyte. A solvent for the electrolyte consisted of 40 wt % ethylene carbonate, 30 wt % diethyl carbonate, and 30 wt % dimethyl carbonate. These cells were first charged under a constant current until charged capacity reached about 1000 mAh/g for the composite powder and then discharged under a constant current until cell voltage reached 1.5 volts. In subsequent cycles, the cells were charged at a constant current to 0.09 volt and held at 0.09 volts for one hour and then discharged at a constant current to 1.5 volts. The electrical charges passed during charging and discharging were recorded and used to determine the capacity of the composite particle powders and the coulombic efficiency for each charging. All the tests were conducted at room temperature (~23° C.).

Figure 2:
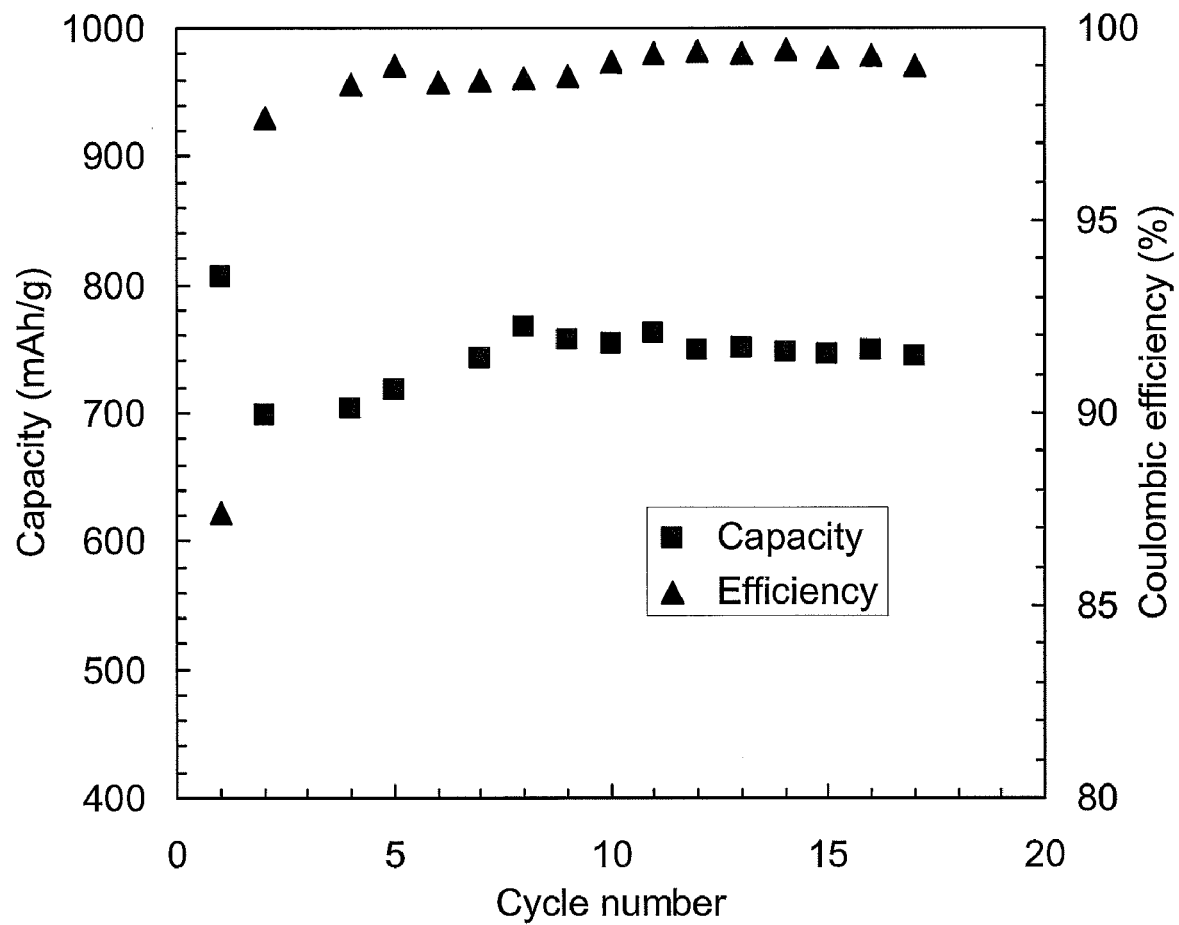
FIGS. 2 and 3 are graphs for two prepared electrodes of discharge capacity and coulombic efficiency as a function of cycle number, according to one embodiment.

FIG. 2 shows results for the first electrode composition with the sample powder. Both the charging and discharging currents were about 77 mA/g. The capacity was about 750 mAh/g, which is more than two times higher than theoretical value for a graphite powder. Further, the coulombic efficiency reached about 99.4%, which indicated the charging and discharging processes were reversible.

Figure 3:
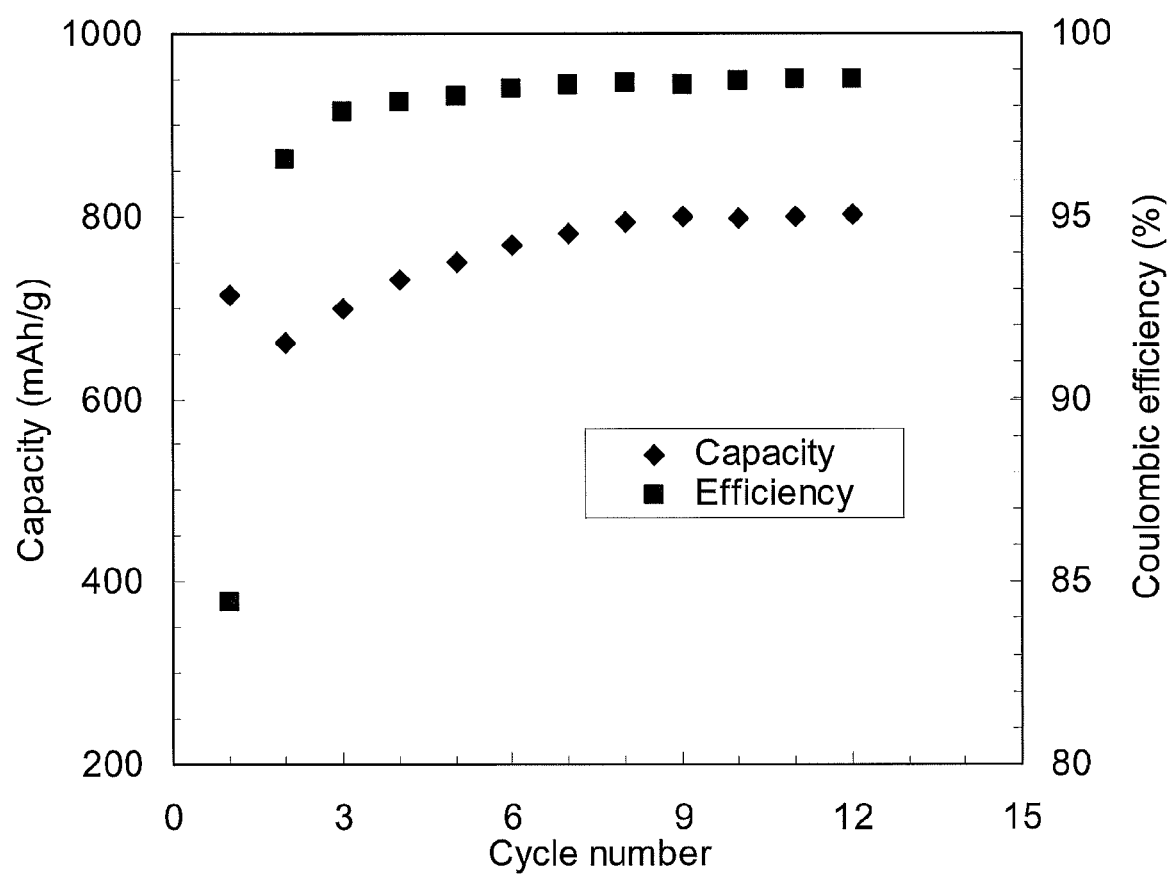

FIG. 3 shows the second electrode composition with the sample powder. Compared to relatively slow charging and discharging conditions utilized with the first electrode composition, both the charging and discharging currents were about 330 mA/g. As shown, the capacity was as high as 800 mAh/g. Similarly, the coulombic efficiency reached about 99.4% during cycling.

The processes described herein thus produce carbon-coated silicon-graphite composite particle powders having desirable properties. Such composite particles include carbon-coating applied to fine silicon particles embedded on larger graphite particles. Utilizing such particle powders as the anode material for lithium ion batteries achieves large capacity and good coulombic efficiency.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

What is claimed is:

1. A method comprising the steps of:
   preparing a liquid suspension comprising particles of carbonaceous material and a solution of carbon residue-forming material with a solvent;
   forming coated carbonaceous particles by subjecting the suspension to conditions that permit precipitation of the carbon residue-forming material onto the carbonaceous material;
   adding silicon particles to the suspension once the coated carbonaceous particles are formed; and
   forming coated silicon-carbon composite particles by subjecting the suspension to conditions that permit precipitation of the carbon residue-forming material onto the silicon particles and the coated carbonaceous particles together.

2. The method of claim 1, further comprising:
   carbonizing the coated silicon-carbon composite particles; and then
   incorporating the coated silicon-carbon composite particles into an anode of an electrical storage cell.

3. The method of claim 1, further comprising stabilizing the coated silicon-carbon composite particles by subjecting the coated silicon-carbon composite particles to an oxidation reaction.

4. The method of claim 1, further comprising carbonizing the silicon-carbon composite particles.

5. The method of claim 1, wherein the carbonaceous material is selected from the group consisting of petroleum pitches, coal tar pitches, calcined petroleum cokes, uncalcined petroleum cokes, highly crystalline cokes, coal tar cokes, synthetic graphite, natural graphite, soft carbons derived from organic polymers, soft carbons derived from natural polymers and combinations thereof.

6. The method of claim 1, wherein the carbonaceous material has an average particle size of less than about 50 µm.

7. The method of claim 1, wherein the silicon particles have an average particle size of less than about 50 µm.

8. The method of claim 1, wherein the carbon residue-forming material is selected from the group consisting of heavy aromatic residues from petroleum pitches, coal tar pitches, lignin, phenolic resins, carbohydrate residues and combinations thereof.

9. The method of claim 1, wherein the carbon residue-forming material is thermally reacted in an inert atmosphere to form a residue that is at least about 85 wt. % carbon.

10. The method of claim 1, wherein forming the coated carbonaceous particles occurs by reducing temperature of the liquid suspension.

11. The method of claim 1, wherein the carbon residue-forming material is dissolved in the solvent to provide a solvent to carbon residue-forming material ratio less than 4.

12. The method of claim 1, wherein coating level of the coated carbonaceous particles alone is from about 1 wt. % to about 10 wt. %.

13. The method of claim 1, wherein coating level of the coated silicon-carbon composite particles is from about 5 wt. % to about 40 wt. %.

14. The method of claim 1, further comprising stabilizing the coated silicon-carbon composite particles by subjecting the coated silicon-carbon composite particles to presence of an oxidizing agent at a temperature of from about 20° C. to about 450° C.

15. The method of claim 1, further comprising carbonizing the silicon-carbon composite particles, wherein the carbonizing is carried out in an inert atmosphere at a temperature of from about 600° C. to about 1400° C.

16. The method of claim 1, wherein the carbon residue-forming material is introduced into the suspension in two or more aliquots.

17. The method of claim 1, further comprising adding a pitch solution to the suspension with the silicon particles and the coated carbonaceous particles.

18. A method comprising the steps of:
preparing a liquid suspension comprising particles of carbonaceous material and a solution of pitch with a solvent;
forming coated silicon-carbon composite particles by subjecting the suspension to conditions that permit precipitation of the pitch onto the carbonaceous material and subsequently onto the carbonaceous material together with silicon particles added to the suspension once the carbonaceous material is coated by the pitch; and
incorporating the coated silicon-carbon composite particles into an anode of an electrical storage cell.

19. The method of claim 18, further comprising adding a quantity of the pitch solution to the suspension with the silicon particles and the carbonaceous particles coated by the pitch.

20. A method comprising the steps of:
preparing a liquid suspension comprising pitch and particles of graphite;
forming pitch coated graphite particles by subjecting the suspension to conditions that permit precipitation of the pitch onto the graphite;
adding silicon particles to the suspension once the pitch coated graphite particles are formed;
adding a pitch solution to the suspension with the silicon particles and the pitch coated graphite particles; and
forming coated silicon-graphite composite particles by subjecting the suspension to conditions that permit precipitation of the pitch onto the silicon particles and the pitch coated graphite particles together.

* * * * *